United States Patent [19]

Miller

[11] Patent Number: 5,538,268
[45] Date of Patent: Jul. 23, 1996

[54] FOLDABLE WALKING STABILIZER DEVICE FOR PHYSICALLY DISABLED PERSONS

[76] Inventor: Jonathan J. Miller, 3306 Lee St., Skokie, Ill. 60076

[21] Appl. No.: 176,946

[22] Filed: Jan. 3, 1994

[51] Int. Cl.⁶ .............................. A61H 3/04; B62B 7/06
[52] U.S. Cl. .......................... 280/87.05; 280/87.041; 482/66; 482/68
[58] Field of Search .................. 280/87.05, 87.051, 280/33.994, 87.041, 651, 655.1; 482/66, 67, 68

[56] References Cited

U.S. PATENT DOCUMENTS

| | | | |
|---|---|---|---|
| 2,165,700 | 7/1939 | Glynn | 482/67 |
| 2,792,874 | 5/1957 | Sundberg | 482/67 |
| 4,211,309 | 7/1980 | Ruggiero | 280/87.041 |
| 4,226,413 | 10/1980 | Daugherty | 482/67 |
| 4,700,730 | 10/1987 | Samuelson et al. | 297/5 |
| 4,765,355 | 8/1988 | Kent | 297/5 |
| 4,867,438 | 9/1989 | Steckert et al. | 280/87.051 |
| 5,172,715 | 12/1992 | Webb | 135/67 |
| 5,224,721 | 7/1993 | Santmann | 280/87.051 |
| 5,277,438 | 1/1994 | Chuang | 280/87.05 |
| 5,351,700 | 10/1994 | Jones, III et al. | 482/66 |
| 5,364,120 | 11/1994 | Shimansky | 280/87.041 |

FOREIGN PATENT DOCUMENTS

| | | | |
|---|---|---|---|
| 2560766 | 9/1985 | France | 482/67 |
| 1491561 | 10/1969 | Germany | 482/68 |
| 1144707 | 3/1985 | U.S.S.R. | 482/69 |
| 1553049 | 9/1979 | United Kingdom | 482/68 |

OTHER PUBLICATIONS

Ready, Set, Go for greater mobility. #6176 Mobilator In Dr Leonard's healthcare catalog.

*Primary Examiner*—Eric D. Culbreth
*Assistant Examiner*—Min Yu
*Attorney, Agent, or Firm*—Martin Faier

[57] ABSTRACT

A foldable walking stabilizer device to assist movement of a physically disabled person, having a base with horizontally aligned opposed arms joined by a connecting arm, rotatable wheel assemblies adapted for rotation responsive to movement by a disabled person, one wheel assembly arranged on each of opposed base arms, upright members extending from each opposed arm above a wheel assemblies, supporting the disabled person between the base arms, and means for regulating movement of the device. The device has a novel spring loaded caster assembly for clearing obstacles, and a braking and tension system which permit the device to be stopped or slowed down.

42 Claims, 5 Drawing Sheets

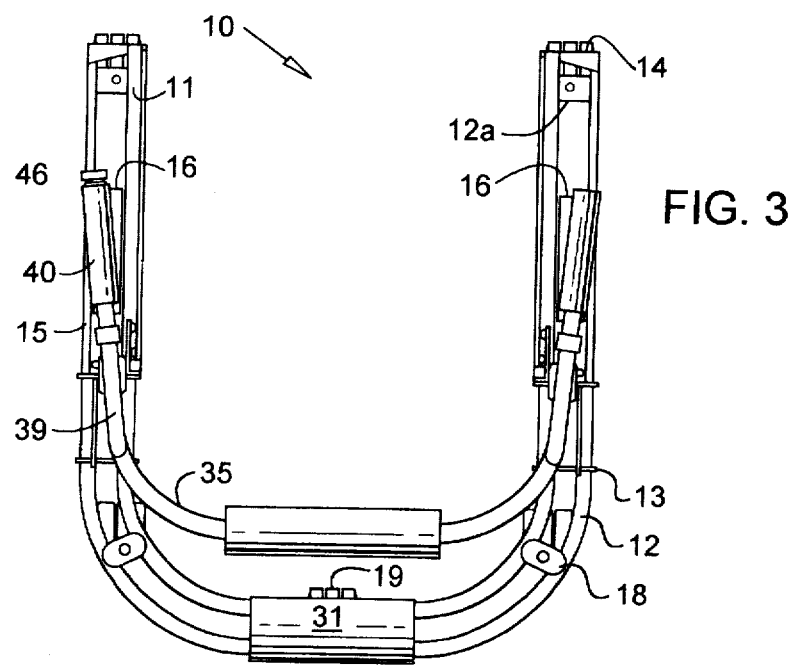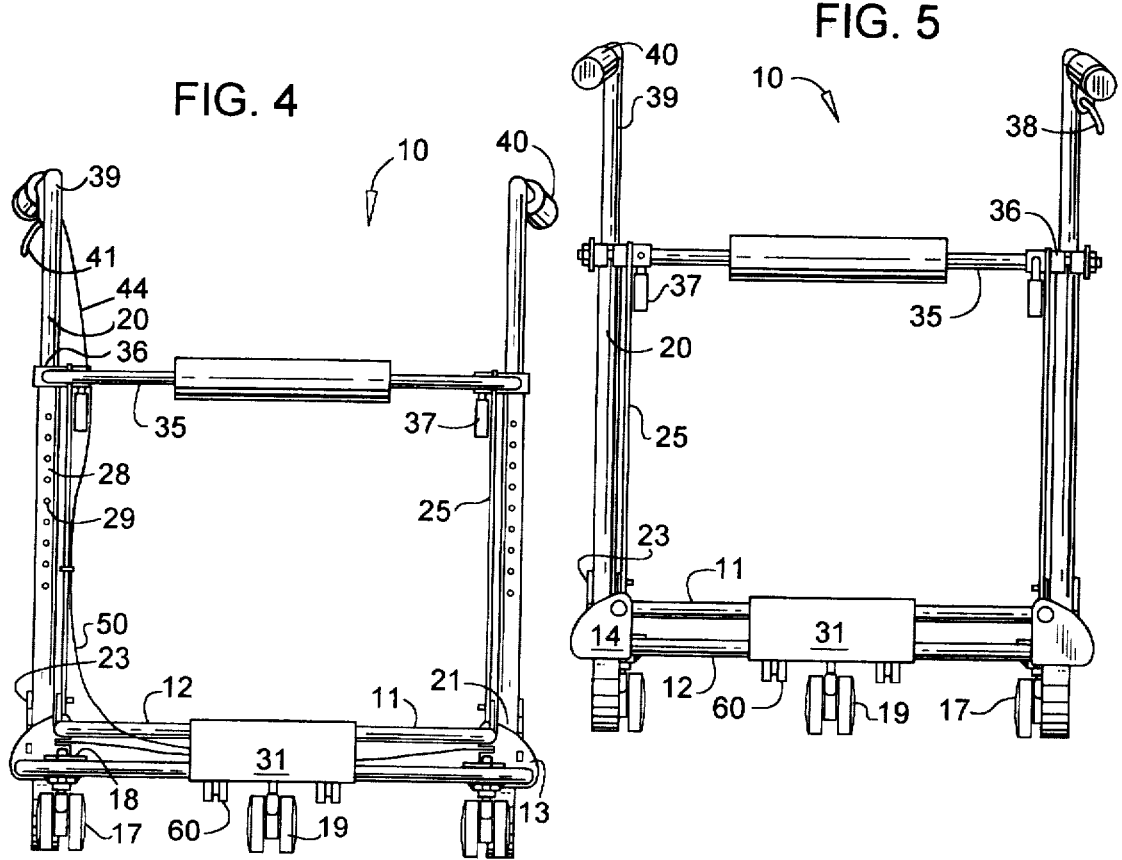

FOLDABLE WALKING STABILIZER DEVICE FOR PHYSICALLY DISABLED PERSONS

BACKGROUND OF THE INVENTION

This invention relates to a foldable walking stabilizer device for physically disabled persons, allowing such persons to move in a natural and well supported manner, and is more particularly concerned with a foldable U-shaped rolling walking stabilizer device which provides great control for the user and is very stable and maneuverable.

Conventional walker devices have comprised light weight tubular frames, usually of aluminum, which are lifted by the user and manipulated in the direction of desired movement, then placed on the ground or other surface to support the next step of the user. These walker devices are very slow and cumbersome, require substantial effort to lift and manipulate, and their use is often taxing and causes pain to a physically disabled person. An example of such a conventional invalid walker device is shown in Lewy U.S. Pat. No. 4,922,940, granted May 8, 1990.

To improve the maneuverability of such devices, wheels have been added to them; for example, in Berning U.S. Pat. No. 4,941,496, granted Jul. 17, 1990, a walker device with wheels is disclosed, and this device has two wheels on its foremost legs. Further improvements have been developed, such as providing wheels on all four supports, and making such walker devices foldable to be more convenient to transport and store, as shown, for example, in Rose U.S. Pat. No. 4,907,794 of Mar. 13, 1990. Brakes for rolling walker devices are also disclosed in the prior art, such as in Turbeville U.S. Pat. No. 5,020,560, dated Jun. 4, 1991, and such braking systems usually make the walker easier for a disabled person to stop.

However, these prior art walkers have not been as stable and maneuverable as desired, or provide the desired high level of control, and have been inadequately versatile to accommodate some qualitative as well as quantitative disabilities of the intended users. For example, such conventional walker devices at best to a very limited extent only permit the user to turn in place, usually by picking up the device, and they do not provide optimum and quick control for the user, with minimum effort, while giving suitable support under most conditions of use. Nor are such control mechanisms sufficiently protected from misadjustment or abuse during normal operations. Additionally, these prior art devices do not anticipate unforeseen difficulties which a disabled user may run into, such as an inability to cope with obstacles such as curbs or rough surfaces, an inability to avoid sudden obstacles or hazards, or an inability to lift or cope with even relatively light weights.

SUMMARY OF THE INVENTION

In the present invention, a walking aid having a U-shaped base for supporting a disabled person in a safe and naturally balanced position and which allows for bracing the user in every direction is provided. This base is aligned with the user to provide reliable support at the sides, forward and back of the user. Also, applicant's novel device is ergonomically designed and has a handle bar which is comfortably positioned at the user's sides, with the handles pitches outwardly and downwardly, arranged so that the user's arms are fully or near fully extended. The device has convenient foldable supports extending from the base to the sides of the user, which is reinforced when in use, but conveniently collapsible for transportation and storage.

Applicant's novel stabilizer device includes a novel brake and tensioning system for controlling or regulating movement of the device, which the user may grasp or otherwise use to manipulate the device and control braking action on one or both sides of the device from one or both of the handles in a responsive manner. This brake control system extends from one of the handles on the handlebar of the support, and is connected along the support through the base to large responsive wheel assemblies on opposed side of the base. This brake control system also is constructed to inhibit unintended misadjustment and abuse. Ease of moving the stabilized rolling walking stabilizer device is aided by these large diameter wheels aligned below at about the center of support for the user, and a plurality of articulatable casters positioned on both sides of the large wheel assemblies assist pivotal movement and sensitive responsive maneuverability of the device.

The stabilizer walking device embodying the present invention also has means for braking its motion with one hand movement of the user, as may be necessary for some patient's with stroke or similar disabilities. This novel rolling walking device also has means for easily, quickly and effectively adjusting the braking system to a desired tension, to an infinite degree, for reflect the strength and capability of the user and the surface or other conditions upon which the device is used, and these adjustments can be made during use of the device.

The base is wide enough to support the user, but not so wide as to inhibit passage through standard doorways or corridors. At least one of the casters carrying the forwardmost area of the base is spring-loaded, permitting the caster to clear most bumps, irregular paving surfaces and obstacles, allowing the caster to pivot on its axle and spring back to its normal position. Each of the posts or supports forming the handlebar are preferably telescopic and adjustable, with means for holding the parts together in a selected adjusted position, and locking adjustment means which can be manipulated by one hand of a disabled person, so that the height of the device can be adjusted to the needs of the user. These supports are also selectively foldable against the base, making the device suitable for easy transport in an automobile or bus and to take up less space for storage.

The upright members also include a reinforcing leg, one for each support, and a bracing bar between the support and leg assemblies, which maintains the supports upright and rigid, without interfering with the foldability of the device. This construction is stable and provides a grab bar for helping the disabled person in getting up or down.

This base and the upright reinforced supports are also constructed to adequately handle and carry accessories for the device, such as a seat or basket, positions in a way to be supported over the base, without cause the device to be top heavy or out of balance.

These important novel features described are provided without adversely affecting the intended use of the device. Compact foldability and versatile height adjustability are preserved, while still providing a rolling walking stabilizer device of great versatility, which is highly maneuverable and stable.

OBJECTS AND ADVANTAGES OF THE INVENTION

It is the object of the present invention to provide a foldable walking stabilizer device for physically disabled persons of the character described.

Another object is to provide a novel U-shaped base and support mechanism for such a device wherein the base and support are aligned with the center of support for the user, and permit the user to turn in place with ease.

Another object is to provide a novel adjustable control and braking mechanism for the device.

Another object is to provide a novel adjustable post and handlebar arrangement for a walking stabilizer device which is positioned for supporting a user naturally.

Another object is to provide a foldable walking stabilizer device having spaced apart wheels of major diameter aligned centrally of its U-shaped base and a plurality of ball casters of lesser diameter arranged in the base around the wheels.

Another object is to provide a novel rolling walking stabilizer device which has spaced apart large wheels for moving the device without skidding or drift and articulatable casters for ease of maneuverability.

Another object is to provide novel spring loaded caster structure for a walking stabilizer device which permits the device to be easily moved over surface irregularities and other similar obstacles by the user.

Another object is to be provide such a device having a novel braking system, which may be manipulated by the user from one handlebar on a support for the device.

Another object is to provide novel means for adjusting and setting the tension on the brakes of such a device.

Another object is to provide a novel adjustable foldable structure suitable for storing and transporting a walking stabilizer device which is rigid and strong enough to support a disabled person when in use.

Another object is to provide telescoped posts for supporting a walking stabilizer device, which has means for collapsing or locking the posts in selected positions by use of a locking member which may be manipulated with one hand of the user.

Another object is to provide accessories, such as a basket or seat, for a walking stabilizer device, which are usable and positioned on the device in a manner which will not make the device off balance or top heavy.

Another object is to provide a rolling stabilizer device which is easy to set up and use, and very stable and maneuverable.

It is also the object of the present invention to provide a foldable walking stabilizer device which is capable of expedient and relatively inexpensive manufacture, and is most efficient for use by a disabled person.

These and other object and advantages of the present invention will become more apparent as this description proceeds, taken in conjunction with the accompanying drawing.

BRIEF DESCRIPTION OF THE DRAWINGS

In the drawings:

FIG. 3 is a top plan view of the device shown in FIG. 2.

FIG. 4 is a front elevational view of the device shown in FIG. 2.

FIG. 5 is a rear elevational view of the device shown in FIG. 2.

DESCRIPTION OF A PREFERRED EMBODIMENT

Figure 1:
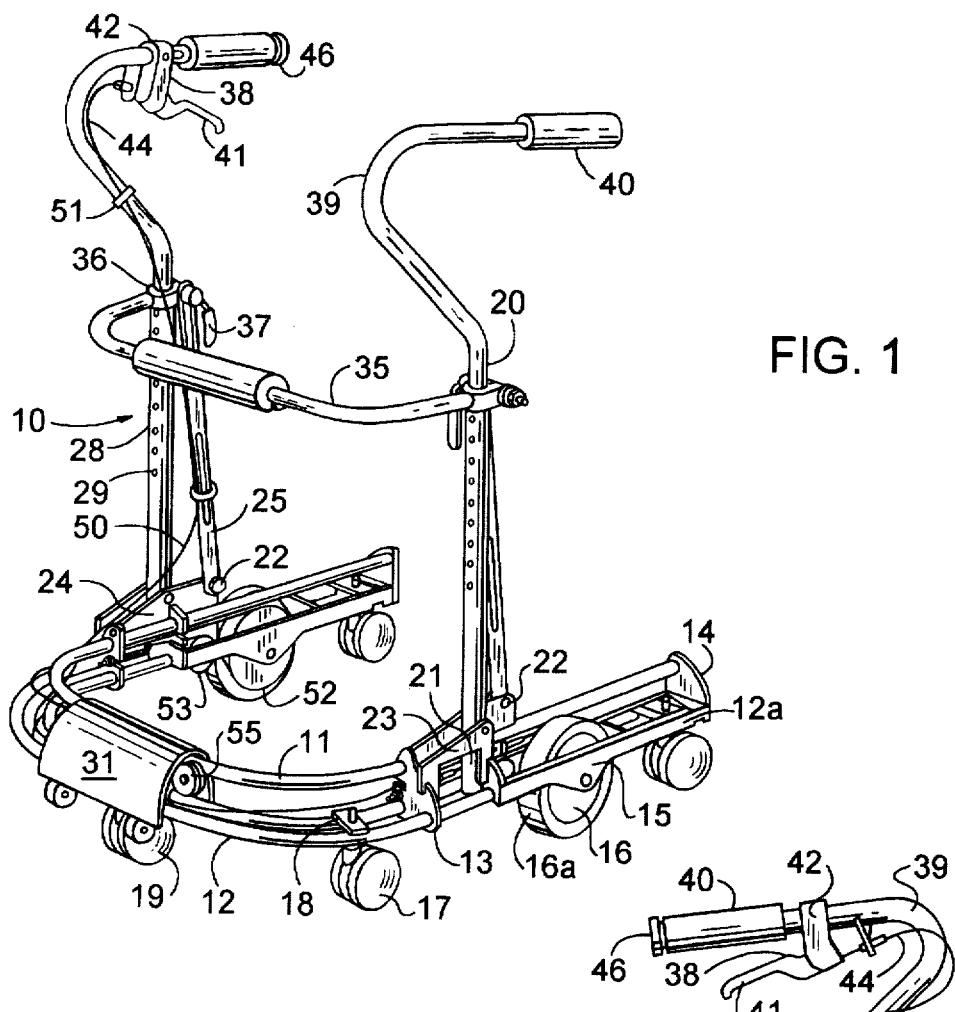
FIG. 1 is a perspective view of a foldable walker stabilizer device embodying the present invention in use.
Figure 2:
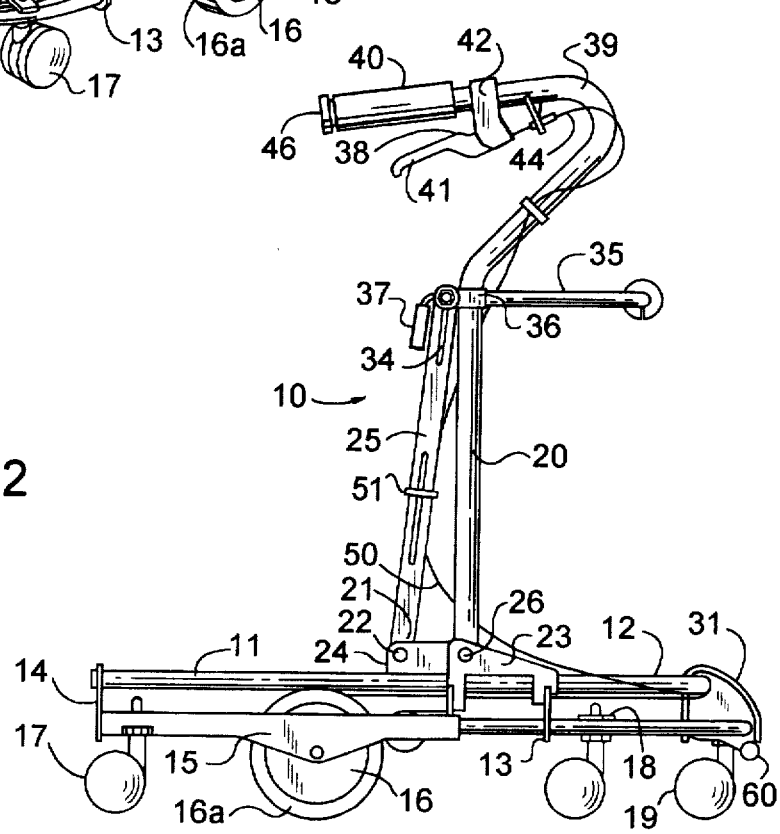
FIG. 2 is a side elevational view of the device shown in FIG. 1.
Figure 6:
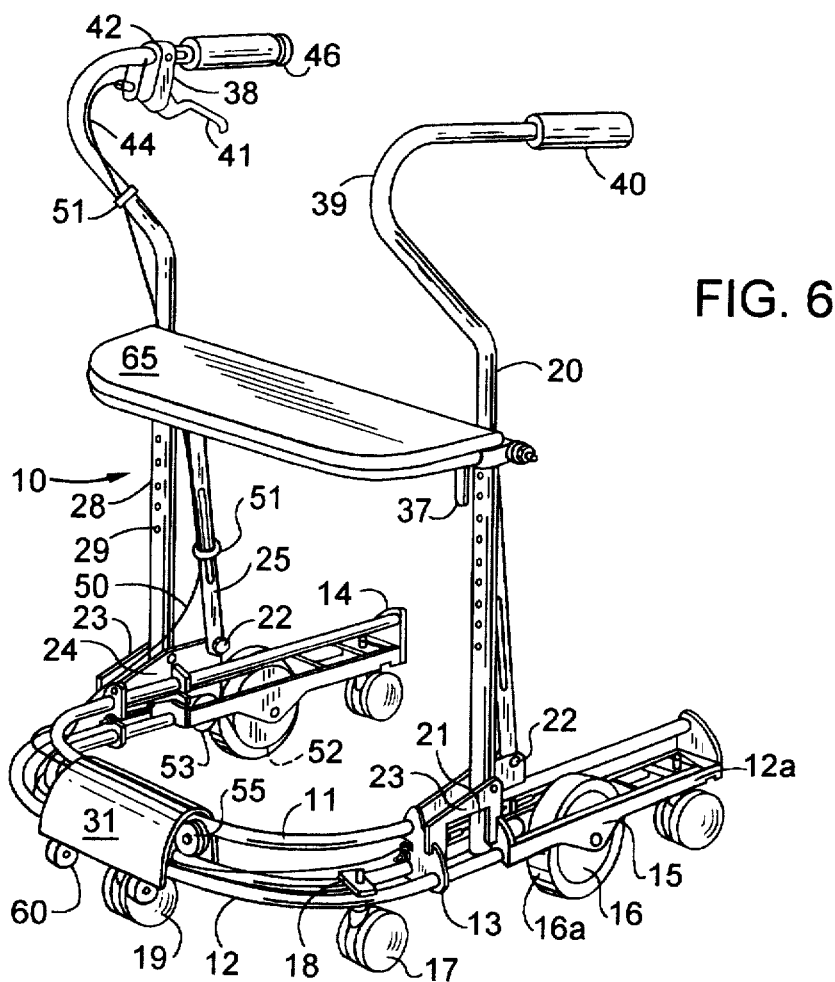
FIG. 6 is a perspective view of the device similar to FIG. 1, except showing an accessory, such as a seat, between the posts.

A rolling walking stabilizer device 10 embodying the present invention comprises a U-shaped base 11 and opposed upright supports 20 pivotally secured on the base.

This base 11 may comprise a plurality of spaced apart tubes 12 bridged by spacer brackets 13 and closed by end walls 14. Rotatably secured in the opposed side walls 15 of a frame 12a carried by the tubes 12 on the base 11 are large wheels assemblies 16, located substantially centrally of the device. These large wheel assemblies 16 are rotatable, but are not articulatable, and they may have tires 16a, so that they will resist skidding or drifting during use by a disabled person. Articulatable casters assemblies 17 are spaced along the base 11 and substantially surround the user, and these caster assemblies are secured by brackets 18 bridging the tubes 12 on each side of each of the wheel assemblies 16, thus supporting the user from falling in almost every direction. These casters assemblies 17 may have ball bearing mountings to aid in their articulation.

The U-shaped base 11 is also narrower from side to side and it is wider from back to front, thus making it easier for a user to manipulate, particularly through doorways and along aisles.

Figure 7:
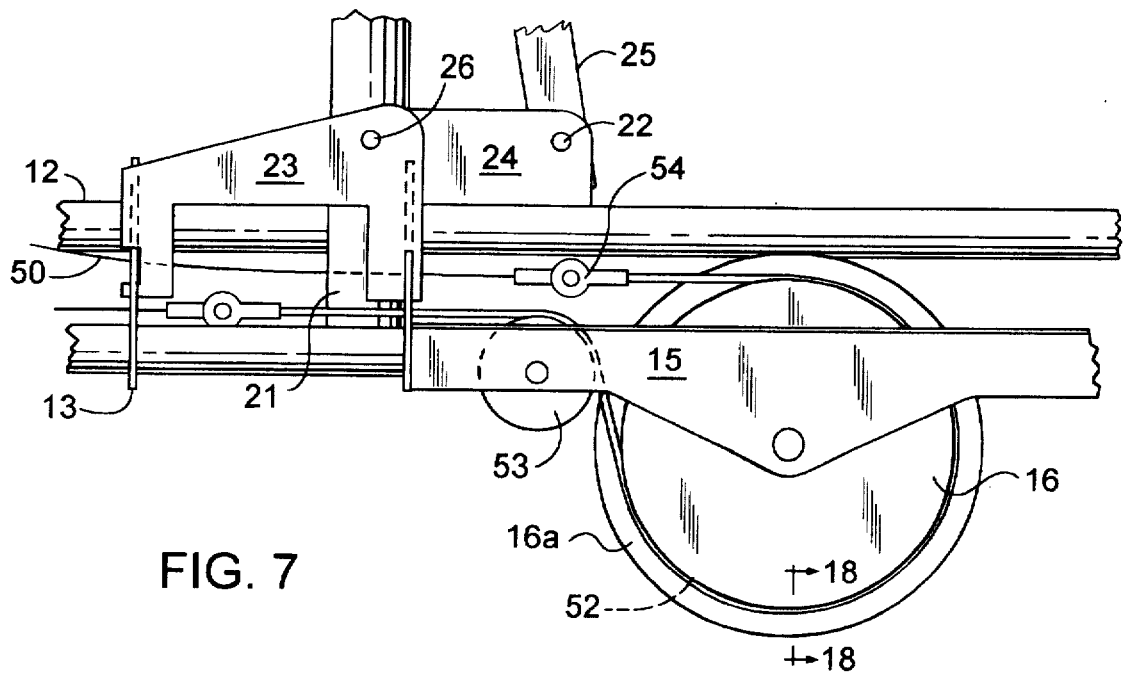
FIG. 7 is a detail view of part of the braking system arrangement.
Figure 16:
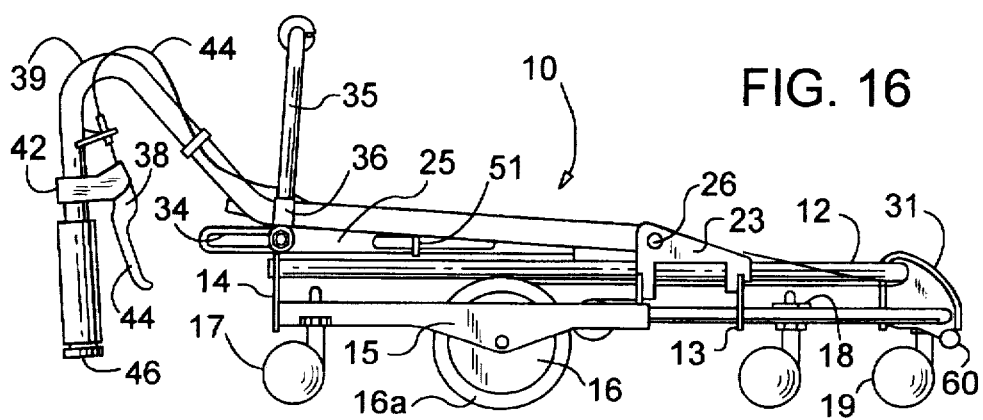
FIG. 16 is a side elevational view similar to FIG. 2, except showing the device in folded condition.

A pair of opposed upright telescoped supports 20, each substantially inverted L-shaped, have a bottom end 21 pivotally secured between outside and inside brackets 23 and 24, respectively, connected to the base 11 as by means of fasteners 22. The base tube spacer bracket 13 between these outside and inside brackets 23 and 24, as shown in FIG. 7, form a yoke having means which blocks pivoting of the bottom end 21 of the support 20 in a rearward direction to prevent unintended folding of the support against the base 11. Each of the inside brackets 24 have an extension pivotally connecting the support fastener 22 which carries an end of a bracing piece or reinforcing leg 25. The support 20 is pivotally connected to its corresponding bracket 23 by means of another fastener 26. These fasteners 22 and 26 permit the supports 20 and their reinforcing legs 25 to be folded against the base 11 for purposes of storage or transport in a manner as shown in FIG. 16, to be described.

Figure 13:
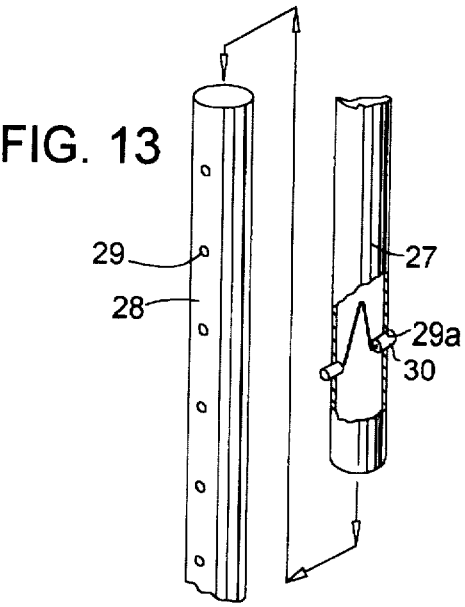
FIG. 13 is a detail perspective view showing the telescopic posts.
Figure 12:
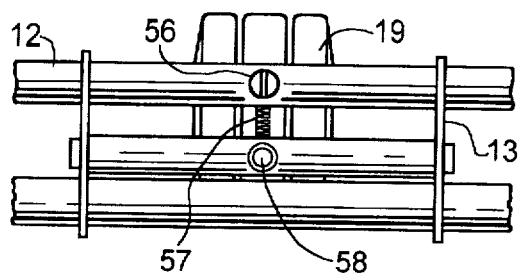
FIG. 12 is a top plan view of the spring loaded caster arrangement shown in FIG. 10.
Figure 14:
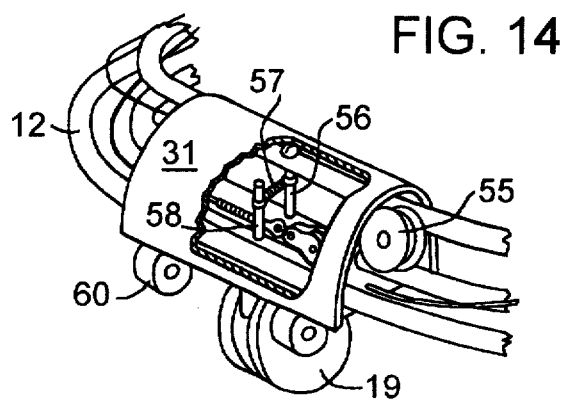
FIG. 14 is a detail perspective view, partially in section, showing the base and caster arrangement.

Preferably, the supports 20 each comprise a pair of telescoped tubes, an inside tube 27 of which is nested within its other or outside tube 28. The outside tube 28 has a series of holes 29 which may be aligned with holes 29a in the inside tube 27, and arranged in the inside tube holes 29a and a selected one of the outside tube holes 29, when aligned, is a compressible spring pin 30 which will maintain the tubes in selected telescoped position when the tube holes are lined up, as shown in FIG. 13. This telescoped arrangement of the tubes 27 and 28 is used to adjust the height of the supports for accommodating the height or other needs of the user of the device.

Figure 17:
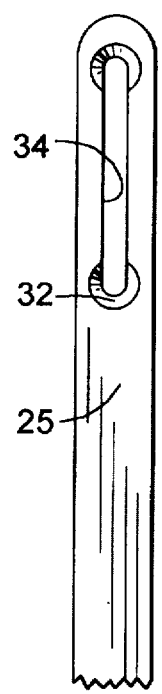
FIG. 17 is a detailed elevational view of the slotted end of the reinforcing leg.
Figure 15:
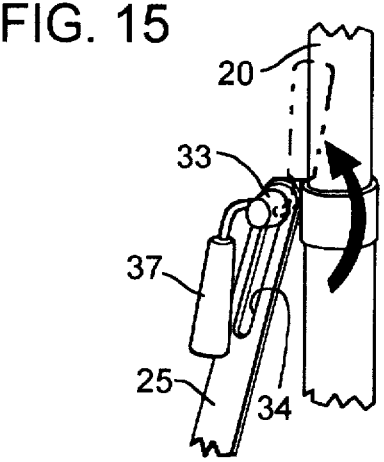
FIG. 15 is a detail view showing the locking arrangement for the telescoped posts.
Figure 18:
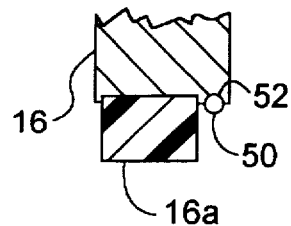
FIG. 18 is a sectional view of part of the braking system taken along line 18—18 of FIG. 7.

Bridging the upright supports 20 is a bar 35, each end of which is secured the upper end of a related leg 25. A compressible split ring collar assembly 36, one on each of the supports 20, has a lock handle 37 which in one position will compress the related support 20, leg 25 and bar 35 together, as shown in solid lines in FIG. 15, and in another position, as shown in fantom line in FIG. 15, will allow the support 20 to pivot against its collar 36 and to slide downwardly in the leg slot 34 for folding the supports 20 and leg assemblies 25 against the base 11, into the position shown in FIG. 16. At the upper and lower ends of the leg slot 34, a portion of the material is milled away, forming recesses 32, as shown in FIG. 17, which permit the locking cam 33 to positively seat into one of the recesses of leg 25 when the handle 37 is drawn up into locking position.

Figure 8:
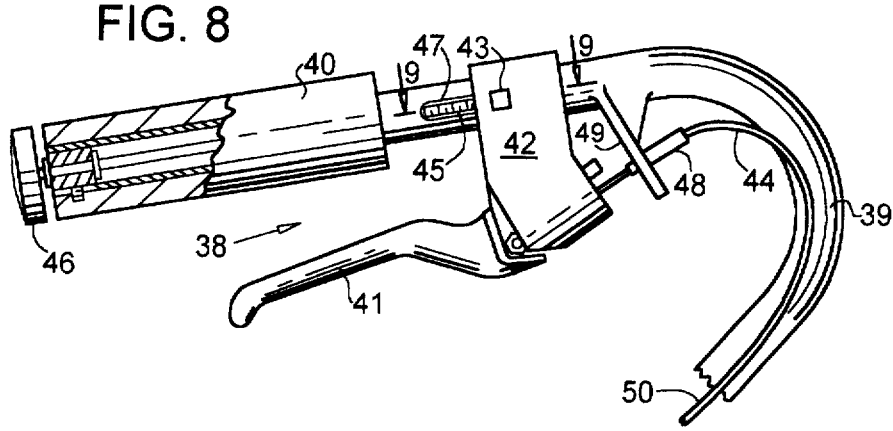
FIG. 8 is a detail perspective view, partially in section, of the brake control lever and tension adjustment mechanism at the handlebar.
Figure 9:
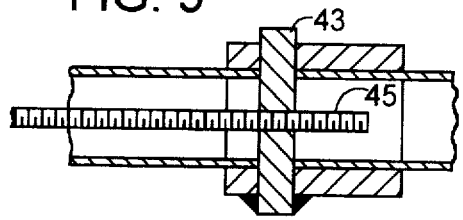
FIG. 9 is a detail section view of the handle brake tensioning arrangement, taken on line 9—9 of FIG. 8.
Figure 10:
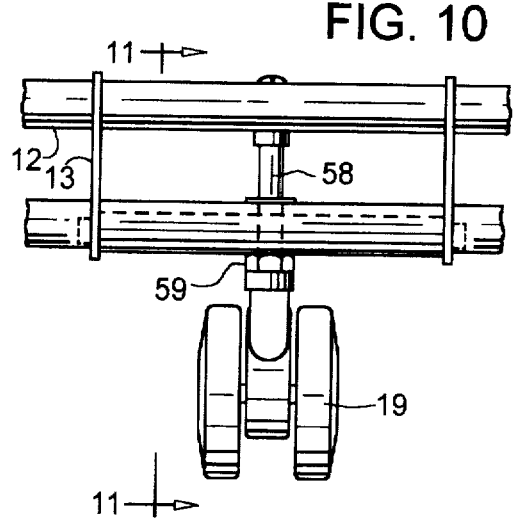
FIG. 10 is a detail front elevational view of spring loaded caster arrangement.
Figure 11:
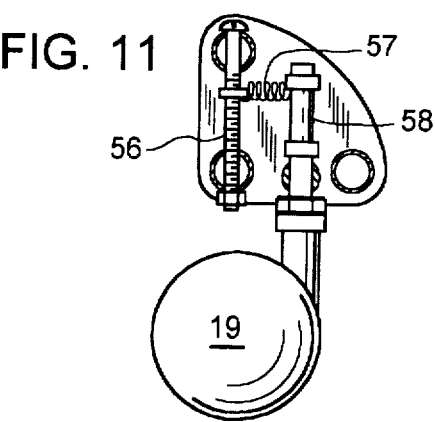
FIG. 11 is a detail sectional view of the caster arrangement shown and taken on line 11—11 in FIG. 10.

On each upper or short leg 39 of each L-shaped support 20 is a gripping handle 40, preferably of rubber-like abrasive texture. On one of these upper legs 39 adjacent its gripping handle 40 there is a bicycle type hand brake assembly 38 having a brake lever 41 secured for pivotable gripable movement in a bracket 42 secured by a pin 43 to the upper leg 39. This lever 41 is connected to a brake cable assembly 44. The pin 43 is arranged in the leg 39 and is connected to a threaded shaft 45, the end of which is engaged by a rotatable knob 46, which when turned will move the brake bracket 42 and pin 43 along a slot 47 in the leg 39, as shown in FIGS. 8 and 9, for increasing or decreasing tension of the brake assembly 39 in a manner to be described.

This brake cable assembly 44, which at one end is connected to the hand brake assembly 38, as described, comprises a cable wire 50 threaded through a connector 48 attached to a bracket 49 attached to the support leg 39, and the cable wire is directed along its related support through connector rings 51 attached to the support 20 and to each of the large wheel assemblies 16 in the base 11, as shown in FIG. 7. This cable wire 50 is tracked through apertures in the spacer brackets 13 and into a groove 52 is each of the large wheel assemblies over pulleys 53 rotatably carried in each base side wall 15 and over other similar pulleys 55 along the base 11 carried in related base tubes 12. The ends of the cable wire are secured together by cable fasteners 54. This brake cable assembly 44 allows the user to put more or less tension on the large wheel assemblies 16, by turning the knob 46 in one direction or the other, to set the appropriate rolling speed for the use and surface, and that adjustment can be made even while the user is using the device.

As best shown in FIGS. 10, 11, 12, and 14, the lead caster 19, mounted within base tube cover 31 is spring loaded. A vertically arranged stud 56 is secured in vertically aligned tubes 12, and connected by a spring 57 to the spindle 58 of the lead caster 19, which is mounted in a fixture 59 for rocking movement, and returned to upright position by the spring. Thus, when an obstacle is encountered by the caster 19, the caster rocks in its fixture to clear the obstacle, without jolting the user. Small wheels 60 may be arranged on both sides of the lead caster 19 for trailing the device when folded.

An auxiliary appliance 65, such as a seat or a basket or other device, may be mounted and secured on the bridge bar 35, which spans the supports 20 at their joinder to the legs 25. This mounting point is preferred because it best supports the appliance 65 near the center of gravity of the device 10, but still within easy access to the user.

While a preferred embodiment of this invention has been shown and described in considerable detail, it should be understood that it is not intended that the invention should be limited to the exact construction disclosed, as many variations in the device may be made without departing from the spirit or scope of the invention. Accordingly, only the appended claims should limit the spirit or scope of the invention.

I claim:

1. In a foldable stabilizer device to assist movement of a physically disabled person adapted to be collapsed for storage and transport, the combination comprising (a) a rolling base, (b) a pair of wheel assemblies secured on the base rotatable responsive to movement of said device by said disabled person, said wheel assemblies being adapted for rotation in a selected direction responsive to movement utilizing said device by said disabled person, (c) a plurality of caster assemblies secured for articulation in said base, said caster assemblies arranged one on each side of each of said rotatable wheel assemblies in its direction of rotation, (d) upright members, one extending from said base above each of said wheel assemblies, (e) bridge means secured to and connecting said upright members, (f) said upright members and bridge means being selectively foldable away from said base for supporting said disabled person on said device and toward said base to collapse said upright members and bridge means against said base for storage and transport of said device.

2. In the stabilizer device recited in claim 1, wherein said base has a plurality of parallel tubes and means for holding said tubes in spaced relation with one another.

3. In the stabilizer device recited in claim 2, wherein said tube holding means comprises a plurality of brackets arranged along the length of said base for securing said tubes together.

4. In the stabilizer device recited in claim 3, wherein a bracket adjacent a support comprises a yoke bearing against said base for resisting folding of said support in a first direction.

5. In the stabilizer device recited in claim 4, wherein said yoke directs folding of said support toward said base in a direction opposed to said first direction.

6. In the stabilizer device recited in claim 1, wherein said base has a connecting arm which carries a rockable caster assembly adapted for tilting movement in said base responsive to movement of said device to clear an irregular surface.

7. In the stabilizer device recited in claim 6, wherein said rockable caster assembly comprising a caster having a stem rockably secured to said base, rigid anchor means secured on said base, and spring means connecting said stem and said anchor means for permitting said rockable caster to tilt responsive to surface irregularities and to return to a predetermined position after clearing such irregularities.

8. In the stabilizer device recited in claim 1, wherein said upright members each are substantially the shape of an inverted L, one leg of which is connected to said base and the other leg of which comprises a handle which may be grasped by said disabled person.

9. In the stabilizer device recited in claim 8, wherein said one leg is pivotally connected to said base.

10. In the stabilizer device recited in claim 8, wherein said handle is inclined downwardly toward and outwardly from said base.

11. In the stabilizer device recited in claim 8, wherein said one leg has a portion which is bent toward said handle and another portion bent away from said handle.

12. In the stabilizer device recited in claim 8, wherein said upright members have selectively adjustable means to vary the height of said handles corresponding to the comfortable moving height of said disabled person.

13. In the stabilizer device recited in claim 12, wherein said adjustable means comprises interlocked members which may be selectively extended or collapsed relative to one another and locked in selected position.

14. In the stabilizer device recited in claim 13, wherein said interlocked members comprise telescoped tubes and means for removably securing said tubes in selected position.

15. In the stabilizer device recited in claim 1, wherein said upright members are pivotally connected to said base.

16. In the stabilizer device recited in claim 1, wherein a bridging bar connects said upright members.

17. In the stabilizer device recited in claim 16, wherein said bridging bar is arranged intermediate the height of said upright members.

18. In the stabilizer device recited in claim 17, wherein an auxiliary appliance is secured on said bridging bar.

19. In the stabilizer device recited in claim 17, wherein a seat is secured on said bridging bar.

20. In the stabilizer device recited in claim 1, wherein a reinforcing leg is connected to with each of said upright members.

21. In the stabilizer device recited in claim 20, wherein said reinforcing leg extends from said base to a point intermediate the height of said upright member.

22. In the stabilizer device recited in claim 20, wherein said reinforcing leg and upright member are both connected to the base by a pivot connection and foldable toward said base.

23. In the stabilizer device recited in claim 22, where said leg and member are connected to said opposed base arms are pivotally connected together by a locking means.

24. In the stabilizer device recited in claim 23, wherein said locking means comprises a locking cam assembly.

25. In the stabilizer device recited in claim 24, wherein said locking cam assembly has means for selectively positively locking said leg and said upright member together.

26. In the stabilizer device recited in claim 1, wherein control means regulates movement of at least one of said wheel assemblies.

27. In the stabilizer device recited in claim 26, wherein said 18 control means comprises a brake assembly operable by a disabled person from at least one of said upright members.

28. In the stabilizer device recited in claim 27, wherein said brake assembly comprises a brake handle on said upright member and a cable assembly associated with said wheel assembly.

29. In the stabilizer device recited in claim 28, wherein said brake assembly has adjustable means for controlling the tension applied to said wheel assembly.

30. In the stabilizer device recited in claim 29, wherein said adjustable means comprises a handle on said upright member, a brake control pivotally arranged and slidable on said handle, and a tension control associated with said brake control and cable assembly for slidably moving said brake control on said handle to tighten or loosen said cable assembly.

31. In the stabilizer device recited in claim 28, wherein said cable assembly is connected to said wheel assembly through said base.

32. In the stabilizer device recited in claim 31, wherein said cable assembly has pulley members for adjusting tension applied on said wheel assembly.

33. In the stabilizer device recited in claim 1, wherein said wheel assemblies comprise wheels arranged in parallel relation adapted to rotate in the same direction.

34. In the stabilizer device recited in claim 1, wherein said upright members adapted comprise telescoped members for selective adjustment corresponding to a comfortable position of said disabled person.

35. In the stabilizer device recited in claim 34, wherein said upright members have handles remote from said base for supporting said person on said device.

36. In the stabilizer device recited in claim 35, wherein said handles extend outwardly from and downwardly toward said base for comfortably supporting said person and are shaped to extend over said base when said uprights are collapsed for transport and storage.

37. In the stabilizer device recited in claim 1, wherein legs extend from said base for reinforcing said device.

38. In the stabilizer device recited in claim 37, wherein said legs, upright members and bridge means are foldable and connected by a pivot connection to said base.

39. In the stabilizer device recited in claim 38, wherein a cam lock selectively positively locks said legs, upright members and bridge means together in extended or collapsed position.

40. In the stabilizer device recited in claim 1, wherein said regulating means comprises tensioning structure connected with at least one of said wheel assemblies for controlling the speed of rotation of said wheel assembly.

41. A caster assembly for a stabilizer device to assist walking movement of a physically disabled person over an irregular surface, said caster assembly comprising:

(a) a rolling base adapted for movement over said surface, said base having opposed upright members extending therefrom for supporting a disable person centrally of said base, (b) opposed rotatable wheel assemblies secured on said base, one wheel assembly associated with each of said opposed upright members, said wheel assemblies being adapted for rotation in a direction responsive to movement utilizing said device by said disabled person, (c) a plurality of caster assemblies secured for articulation in said base, said caster assemblies arranged one on each side of each of said rotatable wheel assemblies in its direction of rotation, (d) a central caster assembly secured in said base for articulation, (e) spring means connecting said base and said central caster assembly adapted for movement when encountering irregularity in said surface, said spring means being adapted to clear said base over said irregularity and to return said caster to a predetermined position when cleared.

42. In a stabilizer device to assist controlled movement of a physically disabled person, the combination comprising:

(a) a base having spaced apart rotatable wheel assemblies and upright supports one in alignment with each wheel assembly, said supports being adapted to support said disabled person, (b) brake control means on said supports and connected to at least one of said wheel assemblies adapted for use by said disabled person to stop movement of said device, (c) adjustable which assembly regulating means including an element applying constant tension to the wheel assembly for selectively tightening or loosening tension applied to at least one of said wheel assemblies, and (d) a plurality of caster assemblies secured for articulation in said base, said caster assemblies arranged one on each side of each of said rotatable wheel assemblies in its direction of rotation.

* * * * *